United States Patent
Kuroki et al.

(10) Patent No.: US 7,789,047 B2
(45) Date of Patent: Sep. 7, 2010

(54) HYDROGEN-FUELED INTERNAL COMBUSTION ENGINE

(75) Inventors: Rentaro Kuroki, Susono (JP); Tomohiro Shinagawa, Sunto-gun (JP); Yasushi Ito, Susono (JP); Makoto Suzuki, Mishima (JP); Kenichi Yamada, Yaizu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 182 days.

(21) Appl. No.: 11/817,348

(22) PCT Filed: Apr. 7, 2006

(86) PCT No.: PCT/JP2006/307880

§ 371 (c)(1),
(2), (4) Date: Aug. 29, 2007

(87) PCT Pub. No.: WO2006/126341

PCT Pub. Date: Nov. 30, 2006

(65) Prior Publication Data

US 2008/0245318 A1   Oct. 9, 2008

(30) Foreign Application Priority Data

May 24, 2005 (JP) ............................. 2005-151276
Sep. 15, 2005 (JP) ............................. 2005-268914

(51) Int. Cl.
*F02B 43/08* (2006.01)
(52) U.S. Cl. .................. 123/3; 123/DIG. 12; 123/1 A
(58) Field of Classification Search .......... 123/DIG. 12, 123/3, 1 A, 575, 576, 577, 578, 525, 27 GE
See application file for complete search history.

(56) References Cited

U.S. PATENT DOCUMENTS

| 4,017,268 A | * | 4/1977 | Gilley ......................... 44/457 |
| 4,111,160 A | * | 9/1978 | Talenti ....................... 123/1 A |
| 4,528,947 A | | 7/1985 | Olivera |
| 5,178,118 A | | 1/1993 | Nakamats et al. |
| 5,887,554 A | * | 3/1999 | Cohn et al. ..................... 123/3 |
| 6,311,648 B1 | | 11/2001 | Larocque |
| 6,401,445 B1 | | 6/2002 | Demetri |
| 7,021,249 B1 | * | 4/2006 | Christison ....................... 123/3 |

(Continued)

FOREIGN PATENT DOCUMENTS

JP       57-66267        4/1982

(Continued)

*Primary Examiner*—Michael Cuff
*Assistant Examiner*—Hung Q Nguyen
(74) *Attorney, Agent, or Firm*—Oblon, Spivak, McClelland, Maier & Neustadt, L.L.P.

(57) ABSTRACT

A hydrogen-fueled internal combustion engine that uses liquid hydrocarbon fuel and hydrogen gas as fuel, which improves mixability of liquid hydrocarbon fuel and hydrogen gas and reduces the number of parts required for a fuel supply that supplies the two types of fuel. The hydrogen-fueled internal combustion engine includes a fuel injection device injecting hydrocarbon fuel; a fuel supply supplying hydrocarbon fuel to the fuel injection device; and a microbubble generation device generating microbubbles of hydrogen gas and mixing the generated microbubbles of hydrogen gas into liquid hydrocarbon fuel in the fuel supply. The hydrogen gas microbubbles are supplied, for instance, to a fuel supply path and fuel tank, which constitute the fuel supply.

16 Claims, 7 Drawing Sheets

U.S. PATENT DOCUMENTS

| | | | |
|---|---|---|---|
| 7,401,578 B2 * | 7/2008 | Otterstrom et al. | 123/3 |
| 2003/0056510 A1 | 3/2003 | Ovshinsky et al. | |
| 2004/0255873 A1 * | 12/2004 | Cueman et al. | 123/1 A |
| 2006/0090712 A1 * | 5/2006 | Ehresman | 123/3 |

FOREIGN PATENT DOCUMENTS

| | | |
|---|---|---|
| JP | 60-33992 | 8/1985 |
| JP | 04-008853 | 1/1992 |
| JP | 2002-156102 | 5/2002 |
| JP | 2002-227712 | 8/2002 |
| JP | 2003 293809 | 10/2003 |
| JP | 2004 100501 | 4/2004 |
| JP | 2004 116398 | 4/2004 |
| JP | 2004 239138 | 8/2004 |
| JP | 2005-240657 | 9/2005 |
| WO | 86 04117 | 7/1986 |
| WO | 95 04590 | 2/1995 |
| WO | 02 090743 | 11/2002 |
| WO | 02 090749 | 11/2002 |

* cited by examiner

HYDROGEN-FUELED INTERNAL COMBUSTION ENGINE

TECHNICAL FIELD

The present invention relates to a hydrogen-fueled internal combustion engine that uses both hydrocarbon fuel and hydrogen gas as fuel.

BACKGROUND ART

A certain conventional hydrogen-fueled internal combustion engine supplies hydrocarbon fuel and hydrogen gas to a combustion chamber for combustion purposes while a regular internal combustion engine uses gasoline or other hydrocarbon fuel for combustion purposes. This type of hydrogen-fueled internal combustion engine uses hydrogen gas as fuel in addition to hydrocarbon fuel and improves the combustion efficiency by making use of the fast burn and other characteristics of the hydrogen gas. Since the combustion efficiency improves, the air-fuel ratio can be shifted toward a leaner region (that is, the lean limit can be raised). As a result, it is possible to lower the fuel consumption rate and reduce the amounts of NOx (nitrogen oxide) exhaust, THC (total hydrocarbon) exhaust, and the like. This type of hydrogen-fueled internal combustion engine is disclosed, for instance, by the following Patent Documents.

Patent Document 1: Japanese Patent Laid-Open No. 2004-116398

Patent Document 2: Japanese Patent Laid-Open No. 2004-239138

Patent Document 3: Japanese Patent Laid-Open No. 2003-293809

Patent Document 4: Japanese Patent Laid-Open No. 2004-100501

DISCLOSURE OF THE INVENTION

In the above conventional hydrogen-fueled internal combustion engine, however, the liquid hydrocarbon fuel is injected into an intake path or the combustion chamber via fuel supply means such as a fuel injection device, a fuel delivery pipe or fuel supply path dedicated to the hydrocarbon fuel. The hydrogen gas is injected into the intake path or the combustion chamber via hydrogen gas supply means such as a fuel injection device, a fuel delivery pipe or fuel supply path dedicated to the hydrogen gas. In the conventional hydrogen-fueled internal combustion engine, the two types of fuel are injected via separate paths as described above. Therefore, the liquid hydrocarbon fuel and hydrogen gas are not readily mixed in the combustion chamber in a uniform manner. Further, a large amount of hydrogen gas cannot be mixed into the hydrocarbon fuel so that the primary object of improving the combustion efficiency by hydrogen gas addition is not fully accomplished. In other words, when the hydrocarbon fuel and hydrogen gas are separately injected as in the conventional hydrogen-fueled internal combustion engine, the hydrocarbon fuel and hydrogen gas cannot be mixed properly. As a result, the combustion efficiency does not adequately improve.

Further, the two types of fuel are supplied via separate paths in the above conventional hydrogen-fueled internal combustion engine. Therefore, each type of fuel requires the use of a dedicated fuel injection device. Consequently, the number of required parts increases to degrade mountability and raise the production cost.

A first object of the present invention is to provide a hydrogen-fueled internal combustion engine that can solve the above problem with the conventional hydrogen-fueled internal combustion engine, mix the liquid hydrocarbon fuel and hydrogen gas in an excellent manner, and reduce the number of parts required for the fuel supply means for the two types of fuel.

In accomplishing the above object, according to a first aspect of the present invention, there is provided a hydrogen-fueled internal combustion engine that uses liquid hydrocarbon fuel and hydrogen gas as fuel, the hydrogen-fueled internal combustion engine comprising: a fuel injection device for injecting the hydrocarbon fuel; fuel supply means for supplying the hydrocarbon fuel to the fuel injection device; and a microbubble generation device for generating microbubbles of hydrogen gas and mixing the generated microbubbles of hydrogen gas into the liquid hydrocarbon fuel in the fuel supply means.

The first aspect of the present invention mixes the liquid hydrocarbon fuel and hydrogen gas before they reach the fuel injection device. Therefore, the mixability of hydrocarbon fuel and hydrogen gas is better than when they are separately injected and fed into the combustion chamber. Further, microbubbles of hydrogen gas are mixed into the hydrocarbon fuel. Therefore, a large amount of hydrogen gas can be mixed into the hydrocarbon fuel so that the mixability of hydrocarbon fuel and hydrogen gas improves. It should also be noted that the fuel injection device, fuel delivery pipe, and the like can be shared by the two types of fuel.

According to a second aspect of the present invention, there is provided the hydrogen-fueled internal combustion engine as described in the first aspect, wherein the microbubble generation device is positioned so as to add microbubbles of hydrogen gas to hydrocarbon fuel in a fuel supply path that constitutes the fuel supply means.

The second aspect of the present invention provides the same advantages as the first aspect in accordance with the operating state. More specifically, if the addition of hydrogen gas should be avoided depending on the operating state, combustion can be based on hydrocarbon fuel only. On the other hand, if the addition of hydrogen gas is needed, microbubbles of hydrogen gas can be mixed into the hydrocarbon fuel so that the mixability of the two types of fuel improves as is the case with the first aspect of the present invention.

According to a third aspect of the present invention, there is provided the hydrogen-fueled internal combustion engine as described in the first or second aspect, wherein the microbubble generation device is positioned so as to add microbubbles of hydrogen gas to hydrocarbon fuel in a fuel tank that constitutes the fuel supply means.

When microbubbles of hydrogen gas are to be mixed into only the hydrocarbon fuel in the fuel tank, the third aspect of the present invention provides the same advantages as the first aspect. On the other hand, when microbubbles of hydrogen gas are to be mixed into both the hydrocarbon fuel in the fuel tank and the hydrocarbon fuel in the fuel supply path, an increased amount of hydrogen gas can be added for mixing purposes. Therefore, it is possible to further improve the mixability of hydrocarbon fuel and hydrogen gas.

However, if an excessive amount of hydrogen gas is mixed into the liquid fuel, the hydrogen gas may separate from the hydrocarbon fuel before injection from the fuel injection device. The fuel injection amount is adjusted by varying the valve opening time of the fuel injection device. However, if the hydrogen gas is separated from the hydrocarbon fuel, the relationship between the valve opening time and fuel injection amount is impaired so that a desired fuel injection amount may not be obtained. Further, the separated hydrogen gas increases the pressure in the fuel piping. Therefore, it is necessary that the fuel piping have high pressure tightness.

Under the above circumstances, a second object of the present invention is to provide a hydrogen-fueled internal combustion engine that can mix an increased amount of hydrogen gas into hydrocarbon fuel without allowing already-mixed hydrogen gas to separate from the hydrocarbon fuel.

In accomplishing the above object, according to a fourth aspect of the present invention, there is provided the hydrogen-fueled internal combustion engine as described in the first, second, or third aspect, further comprising: hydrogen addition amount determination means for determining the amount of hydrogen gas to be mixed into hydrocarbon fuel by the microbubble generation device in accordance with the operating state of the internal combustion engine and the pressure and/or the temperature of hydrocarbon fuel.

Since microbubbles of hydrogen gas are mixed into hydrocarbon fuel, it is possible to facilitate the solution of hydrogen gas in the hydrocarbon fuel. Even if the amount of hydrogen gas supply exceeds the hydrogen saturation amount, the hydrogen gas can uniformly exist in the hydrocarbon fuel without separating from the hydrocarbon fuel as far as the amount of hydrogen gas supply does not exceed a certain level. The amount of hydrogen gas that can dissolve in the hydrocarbon fuel and the amount of hydrogen gas that can exist in the hydrocarbon fuel as microbubbles without separating from the hydrocarbon fuel are dependent on the pressure and temperature of the hydrocarbon fuel.

The fourth aspect of the present invention determines the hydrogen gas addition amount in consideration of the operating state of the internal combustion engine and the pressure and/or temperature of the hydrocarbon fuel. Therefore, an increased amount of hydrogen gas can be mixed into the hydrocarbon fuel without allowing the already-mixed hydrogen gas to separate from the hydrocarbon fuel at the current pressure and temperature of the hydrocarbon fuel.

In accomplishing the above object, according to a fifth aspect of the present invention, there is provided the hydrogen-fueled internal combustion engine as described in the first, second, or third aspect, further comprising: hydrogen addition amount determination means for determining the amount of hydrogen gas to be mixed into hydrocarbon fuel by the microbubble generation device in accordance with the operating state of the internal combustion engine; and control means for controlling the pressure and/or the temperature of liquid fuel to be supplied to the fuel injection device in accordance with a hydrogen gas addition amount that is determined by the hydrogen addition amount determination means.

The fifth aspect of the present invention controls the pressure and/or temperature of hydrocarbon fuel in accordance with the hydrogen gas addition amount. Therefore, it is possible to prevent hydrogen gas from separating from the hydrocarbon fuel after hydrogen gas addition to the hydrocarbon fuel, the amount of necessary hydrogen gas addition being determined in accordance with the operating state of the internal combustion engine.

According to a sixth aspect of the present invention, there is provided the hydrogen-fueled internal combustion engine as described in the first, second, third, fourth, or fifth aspect, further comprising hydrogen generation means for generating hydrogen gas from a liquid hydrogen compound, wherein the hydrogen generation means generates only the amount of hydrogen gas to be mixed into hydrocarbon fuel by the microbubble generation device.

The sixth aspect of the present invention generates only the amount of hydrogen gas to be mixed into hydrocarbon fuel from a liquid hydrogen compound. Therefore, the range for handling hydrogen in a gaseous state is reduced. In addition, it is not necessary to use a hydrogen gas storage device. Consequently, the system configuration can be simplified.

The hydrogen-fueled internal combustion engine according to the present invention enhances the mixability of liquid hydrocarbon fuel and hydrogen gas. Therefore, when hydrogen gas is added, the combustion efficiency greatly improves so that the lean limit can be remarkably raised. Consequently, the hydrogen-fueled internal combustion engine according to the present invention can greatly reduce the fuel consumption rate and NOx exhaust amount. Further, since the fuel injection device, fuel delivery pipe, and like device are shared by two types of fuel in order to mix the liquid hydrocarbon fuel and hydrogen gas beforehand, the necessity for furnishing each of the two types of fuel with such devices is obviated. As a result, the number of required parts can be reduced.

BEST MODE FOR CARRYING OUT THE INVENTION

Preferred embodiments of the hydrogen-fueled internal combustion engine according to the present invention will now be described in detail with reference to the accompanying drawings. However, it should be understood that the present invention is not limited to the preferred embodiments.

First Embodiment

A first embodiment of the hydrogen-fueled internal combustion engine according to the present invention will now be described with reference to FIGS. 1 and 2.

First of all, the configuration of the hydrogen-fueled internal combustion engine according to the first embodiment will be described with reference to FIG. 1. The reference numeral 1 in FIG. 1 denotes the hydrogen-fueled internal combustion engine according to the first embodiment. Although the figure shows only one cylinder, the present invention can also be applied to a multicylinder hydrogen-fueled internal combustion engine no matter whether it is, for instance, of inline type or V type.

Figure 1:
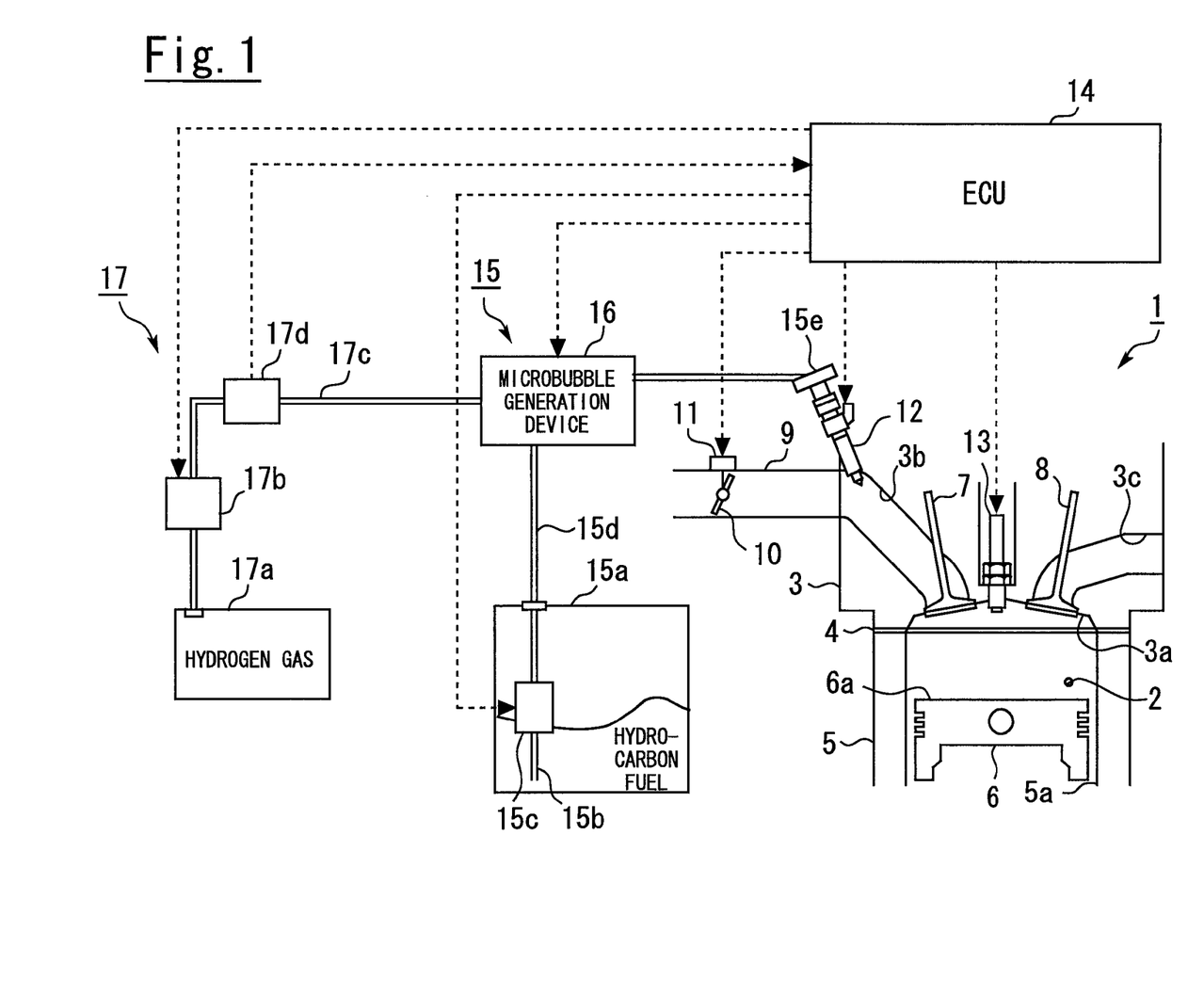
FIG. 1 illustrates the configuration of the hydrogen-fueled internal combustion engine according to a first embodiment of the present invention.
Figure 2:
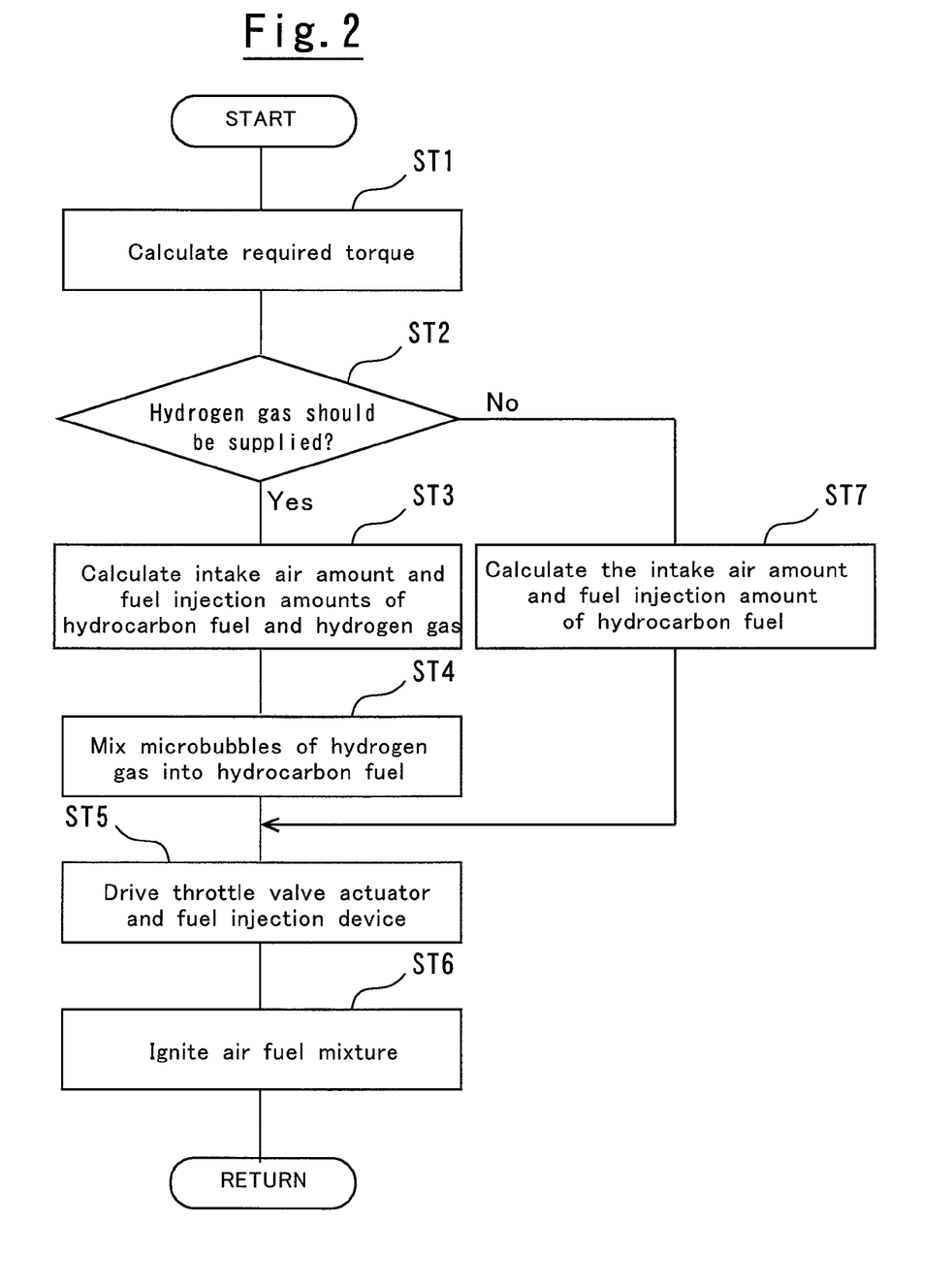
FIG. 2 is a flowchart illustrating a typical operation that is performed by the hydrogen-fueled internal combustion engine according to the first embodiment.

As shown in FIG. 1, the hydrogen-fueled internal combustion engine 1 according to the first embodiment comprises a cylinder head 3, which supplies air and fuel to a combustion chamber 2 and discharges burned intra-cylinder gas from the combustion chamber 2; a cylinder block 5, which is bolted down or otherwise fastened to the underside of the cylinder head 3 via a head gasket 4; and a piston 6, which is positioned in a cylinder bore 5a of the cylinder block 5 and can reciprocate vertically. The combustion chamber 2 is formed by a space that is enclosed by the wall surface of a concave 3a, which is formed in the underside of the cylinder head 3, the wall surface of the cylinder bore 5a, and the top face 6a of the piston 6.

As shown in FIG. 1, the cylinder head 3 according to the first embodiment is provided with at least one intake path 3b and at least one exhaust path 3c. The intake path 3b and exhaust path 3c are open to the combustion chamber 2. The intake path 3b is provided with an intake valve 7, which opens/closes the path to the combustion chamber 2. When the intake valve 7 opens, air is taken into the combustion chamber 2 from the intake path 3b. The exhaust path 3c is provided with an exhaust valve 8, which opens/closes the path to the combustion chamber 2. When the exhaust valve 8 opens, burned intra-cylinder gas is discharged from the combustion chamber 2 to the exhaust path 3c.

The amount of air that is taken into the combustion chamber 2 (intake air amount) is adjusted by varying the open/close angle of a throttle valve 10 that is provided in an intake manifold 9, which communicates with the intake path 3b of the cylinder head 3. The throttle valve 10 is opened and closed by a throttle valve actuator 11, which is shown in FIG. 1.

The cylinder head 3 is provided with a fuel injection device 12, which injects the fuel to be supplied to the combustion chamber 2, and an ignition plug 13, which ignites an air-fuel mixture that is supplied to the combustion chamber 2. In the hydrogen-fueled internal combustion engine 1 according to the first embodiment, the fuel injection device 12 injects fuel into the intake path 3b. The fuel is then mixed with air, introduced into the combustion chamber 2 via the intake path 3b, and ignited by the ignition plug 13.

The operations of the above-mentioned throttle valve actuator 11, fuel injection device 12, and ignition plug 13 are controlled by an electronic control unit (ECU) 14, which is shown in FIG. 1.

For example, the electronic control unit 14 determines the intake air amount and fuel injection amount from prepared map data in accordance with a torque that is required by the hydrogen-fueled internal combustion engine 1. The electronic control unit 14 controls the throttle valve actuator 11 to adjust the valve opening angle of the throttle valve 10 for the purpose of obtaining the determined intake air amount. The electronic control unit 14 also controls the fuel injection device 12 to obtain the determined fuel injection amount. Therefore, air is introduced into the intake path 3b in accordance with the determined intake air amount and fuel injection occurs in accordance with the determined fuel injection amount. When the intake valve 7 subsequently opens, a mixture of the air and fuel is taken into the combustion chamber 2. Afterwards, the electronic control unit 14 controls the ignition plug 13 to ignite the air-fuel mixture in accordance with ignition timing that matches the required torque. This causes the hydrogen-fueled internal combustion engine 1 to output the required torque.

If a variable valve mechanism is furnished so that the open/close time and lift amount of the intake valve 7 and exhaust valve 8 are adjusted as needed in accordance with the operating conditions of the internal combustion engine 1, the operation of the variable valve mechanism is also controlled by the electronic control unit 14.

The hydrogen-fueled internal combustion engine 1 according to the first embodiment uses two types of fuel for combustion purposes: hydrocarbon fuel (gasoline is exemplified in conjunction with the first embodiment) and hydrogen gas. The method for supplying these two types of fuel to the combustion chamber 2 will be described in detail below.

In the hydrogen-fueled internal combustion engine 1 according to the first embodiment, the aforementioned fuel injection device 12 is used to inject the two types of fuel (hydrocarbon fuel and hydrogen gas) into the intake path 3b. It is therefore necessary that the two types of fuel need to be mixed before being fed to the fuel injection device 12.

Before the two types of fuel are fed into the fuel injection device 12, the hydrocarbon fuel is in a liquid state whereas the hydrogen gas is in a gaseous state. Therefore, when the hydrocarbon fuel and hydrogen gas are mixed, hydrogen gas bubbles exist in the liquid hydrocarbon fuel.

In general, normal bubbles in a liquid rise to the surface at a high speed and unite or absorb the other. Therefore, when a large amount of hydrogen gas is mixed into the liquid hydrocarbon fuel, large hydrogen gas bubbles are formed in the hydrocarbon fuel due to union or absorption. If a mixture of such large hydrogen gas bubbles and hydrocarbon fuel is supplied as is to the fuel injection device 12, the injection of hydrogen gas only and the injection of hydrocarbon fuel only may intermittently alternate. If such a situation occurs, the hydrogen-fueled internal combustion engine 1 becomes meaningless because it cannot achieve its primary object. More specifically, the hydrogen-fueled internal combustion engine 1 cannot simultaneously burn the hydrocarbon fuel and hydrogen gas as fuel, for instance, to raise the lean limit.

As such being the case, it is preferred that large hydrogen gas bubbles be not formed within the hydrocarbon fuel. To prevent large hydrogen gas bubbles from being formed, it is necessary to reduce the amount of hydrogen gas addition to the liquid hydrocarbon fuel. If the hydrogen gas addition amount is reduced, the hydrogen gas bubbles do not become large before they reach the fuel injection device 12 even when the hydrogen gas bubbles unite or absorb the other. However, if the amount of hydrogen gas addition to the liquid hydrocarbon fuel is excessively small, the hydrogen-fueled internal combustion engine 1 cannot achieve its primary object.

In addition to the above-mentioned normal bubbles, microbubbles, which have a smaller diameter than the normal bubbles, are also known as bubbles. The characteristics of the microbubbles are described below.

Firstly, the microbubbles in a liquid rise to the surface at a low speed and do not unite or absorb the other. Therefore, the microbubbles can stay in a liquid as individual bodies of gas for a long period of time.

Secondly, the microbubbles have a large surface area per unit volume. Therefore, the microbubbles dissolve in the liquid, become smaller, and eventually vanish. In other words, the microbubbles readily dissolve in a liquid.

Thirdly, the microbubbles pressurize themselves due to surface tension σ. The increase in the pressure is in inverse proportion to the diameter D of a bubble as indicated in Equation (1) below. Therefore, the internal pressure P1 increases with a decrease in the diameter of a bubble. Consequently, the pressure difference ΔP between the bubble internal pressure P1 and external pressure P2 increases.

$$\Delta P = 4\sigma/D \quad (1)$$

As described above, the microbubbles have three characteristics. When the hydrogen gas is in the form of microbubbles, an increased amount of hydrogen gas can be mixed into the liquid hydrocarbon fuel. Further, the increased amount of hydrogen gas can exist in the liquid hydrocarbon fuel for a long period of time.

Thus, the first embodiment is configured so that microbubbles of hydrogen gas are mixed into the liquid hydrocarbon fuel at a stage before the fuel is fed to the fuel injection device 12. The stage before the fuel is fed to the fuel injection device 12 is a stage in which the fuel is in fuel supply means 15, which is shown in FIG. 1 and supplies the fuel to the fuel injection device 12.

As shown in FIG. 1, the fuel supply means 15 according to the first embodiment comprises a fuel tank 15*a* for storing the liquid hydrocarbon fuel; a fuel pump 15*c* for drawing the hydrocarbon fuel from the fuel tank 15*a* via a first fuel supply path 15*b*, applying a predetermined pressure to the hydrocarbon fuel, and forwarding the pressurized hydrocarbon fuel; and a second fuel supply path 15*d* for introducing the fuel, which is supplied from the fuel pump 15*c*, to the fuel injection device 12. The operation of the fuel pump 15*c* is controlled by the electronic control unit 14 in accordance with the operating state of the hydrogen-fueled internal combustion engine 1.

A multicylinder hydrogen-fueled internal combustion engine 1 having a plurality of combustion chambers 2 will now be described. The cylinder head 3 is provided with intake paths 3*b* for the combustion chambers 2. Each intake path 3*b* is provided with the fuel injection device 12. Therefore, the fuel supply means 15 according to the first embodiment also includes a fuel delivery pipe 15*e* that receives the fuel from the second fuel supply path 15*d* and supplies the received fuel to each fuel injection device 12 at a constant pressure.

The liquid hydrocarbon fuel stored in the fuel tank 15*a* is supplied to each fuel injection device 12 by the fuel supply means 15.

Meanwhile, the hydrogen gas, which is another fuel and in the form of microbubbles, is mixed into the liquid hydrocarbon fuel that exists in one of the components of the fuel supply means 15, which comprises the fuel tank 15*a*, first fuel supply path 15*b*, fuel pump 15*c*, second fuel supply path 15*d*, and fuel delivery pipe 15*e* as described earlier. To add the hydrogen gas in the form of microbubbles, the first embodiment includes a microbubble generation device 16 that is shown in FIG. 1. The microbubble generation device 16 forms microbubbles of hydrogen gas. For example, microbubbles having a diameter between several micrometers and several tens of micrometers are currently known. The first embodiment uses a microbubble generation device 16 that generates hydrogen gas microbubbles.

A case where hydrogen gas addition occurs between the fuel pump 15*c* and each fuel injection device 12 will now be described as an example. If hydrogen gas is supplied to the fuel pump 15*c* or fuel delivery pipe 15*e*, their functions (pumping function and pressure stabilization function) may be impaired. Therefore, microbubbles of hydrogen gas are supplied to the second fuel supply path 15*d* with the second fuel supply path 15*d* connected to the microbubble generation device 16 or with the microbubble generation device 16 provided for the second fuel supply path 15*d*.

The microbubble generation device 16 according to the first embodiment may use any microbubble generation method as far as it generates microbubbles of hydrogen gas. Typical microbubble generation methods will now be described below.

For example, the microbubble generation device 16 may blow hydrogen gas into a strong swirling flow to divide hydrogen gas bubbles into microbubbles. When such a method is used, two swirling flows of hydrogen gas and liquid are generated at the center of the microbubble generation device 16 to provide the rotation axis section with an empty space. Further, the empty space is turned into a tornado to generate a strong shearing force for cutting and smashing the drawn hydrogen gas.

Further, the microbubble generation device 16 may use another method in which the hydrogen gas is pressurized so that an increased amount of hydrogen gas is dissolved in the liquid. Cavitation is then invoked, for instance, by raising the flow velocity of the liquid.

Furthermore, the microbubble generation device 16 may use still another method in which hydrogen gas bubbles are ultrasonically vibrated to generate microbubbles.

When the microbubble generation device 16 uses the above typical microbubble generation methods, the microbubbles cannot be generated unless the hydrogen gas is supplied to the microbubble generation device 16. Therefore, the first embodiment includes hydrogen gas supply means 17, which is shown in FIG. 1 and used to supply the hydrogen gas to the microbubble generation device 16.

As shown in FIG. 1, the hydrogen gas supply means 17 includes a hydrogen fuel tank 17*a* for storing compressed, high-pressure hydrogen gas; a hydrogen fuel pump 17*b* for drawing the hydrogen gas from the hydrogen fuel tank 17*a*, applying a predetermined pressure to the hydrogen gas, and pumping out the hydrogen gas; and a hydrogen gas supply path 17*c* for receiving the hydrogen gas delivered from the hydrogen fuel pump 17*b* and introducing the hydrogen gas into the microbubble generation device 16.

The hydrogen gas supply means 17 also includes a hydrogen gas flowmeter 17*d* for detecting the hydrogen gas flow rate in the hydrogen gas supply path 17*c* to which the hydrogen gas is delivered from the hydrogen fuel pump 17*b*. A detection signal generated by the hydrogen gas flowmeter 17*d* is sent to the electronic control unit 14.

The electronic control unit 14 supplies microbubbles of hydrogen gas to the second fuel supply path 15*d* by driving the hydrogen fuel pump 17*b* in accordance with the operating state of the hydrogen-fueled internal combustion engine 1 and driving the microbubble generation device 16 to which the hydrogen gas is supplied from the driven hydrogen fuel pump 17*b*.

As described above, the hydrocarbon fuel and hydrogen gas are mixed at a stage before the fuel injection device 12 is reached. Therefore, the mixability of hydrocarbon fuel and hydrogen gas is better than when they are separately injected and fed into the combustion chamber 2. Further, since microbubbles of hydrogen gas are mixed into the liquid hydrocarbon fuel, a large amount of hydrogen gas can be mixed into the hydrocarbon fuel. Therefore, the hydrogen-fueled internal combustion engine 1 according to the first embodiment can supply an increased amount of hydrogen gas to the combustion chamber 2, greatly improve the combustion efficiency, and operate in a leaner air-fuel ratio region than the conventional counterpart. In other words, the hydrogen-fueled internal combustion engine 1 according to the first embodiment can considerably raise the lean limit by premixing the liquid hydrocarbon fuel and hydrogen gas microbubbles. This makes it possible to greatly reduce the fuel consumption rate and NOx exhaust amount.

When the hydrogen fuel pump 17*b* is to be driven, it is preferred that control be exercised in consideration of the rate of a hydrocarbon fuel flow in the second fuel supply path 15*d*. The amount of possible hydrogen gas microbubble addition to a certain amount of hydrocarbon fuel is limited. If an excessive amount of hydrogen gas microbubbles is supplied, it will be wasted. It is therefore preferred that the hydrogen fuel pump 17*b* be driven without exceeding the limit for the hydrogen gas microbubble supply amount. Consequently, the electronic control unit 14 determines the limit for hydrogen gas microbubble addition in accordance with the rate of a hydrocarbon fuel flow in the second fuel supply path 15*d*, and drives the hydrogen fuel pump 17*b* without exceeding the limit while observing the value detected by the hydrogen gas flowmeter 17*d*.

In the above instance, the hydrocarbon fuel flow rate can be detected by furnishing the second fuel supply path 15*d* with a flowmeter. However, the detected flow rate is substantially proportional to the controlled variable (driving force) for the fuel pump 15*c*. Therefore, the hydrocarbon fuel flow rate may be determined from the controlled variable for the fuel pump 15*c*. Further, map data defining the relationship between the hydrocarbon fuel flow rate or fuel pump controlled variable and the mixable hydrogen gas microbubble supply amount limit in accordance with the flow rate or the controlled variable (that is, the controlled variable for the hydrogen fuel pump 17*b*) is prepared, and the hydrogen fuel pump 17*b* is driven in accordance with the prepared map data.

As described above, the hydrogen-fueled internal combustion engine 1 according to the first embodiment premixes the liquid hydrocarbon fuel and hydrogen gas microbubbles on the upstream side of the fuel injection device 12. Therefore, the hydrogen-fueled internal combustion engine 1 according to the first embodiment can improve the combustion efficiency to raise the lean limit and greatly reduce the fuel consumption rate and NOx exhaust amount, as described above.

Further, the hydrogen-fueled internal combustion engine 1 according to the first embodiment can reduce the number of required parts by premixing the liquid hydrocarbon fuel and hydrogen gas microbubbles. More specifically, the hydrogen-fueled internal combustion engine 1 according to the first embodiment does not require the conventional hydrogen gas equipment such as a fuel injection device, fuel delivery pipe, and fuel supply path that are dedicated to hydrogen gas (which corresponds to the second fuel supply path 15*d*), and allows the two types of fuel to share the fuel injection device 12, second fuel supply path 15*d*, and fuel delivery pipe 15*e*. This makes it possible to improve the mountability of various parts and reduce the production cost.

A typical operation that is performed by the hydrogen-fueled internal combustion engine 1 according to the first embodiment will now be described with reference to a flowchart in FIG. 2.

First of all, the electronic control unit 14 calculates the torque required by the hydrogen-fueled internal combustion engine 1 in accordance with the engine speed and accelerator opening of the hydrogen-fueled internal combustion engine 1 (step ST1). For example, the required torque is determined from prepared map data that includes the engine speed and accelerator opening as parameters.

Subsequently, the electronic control unit 14 detects the operating state in accordance with the engine speed, accelerator opening, air-fuel ratio, and the like, and judges whether hydrogen gas should be supplied (step ST2). If, for instance, it is detected that the engine is operating under low or medium load and at a theoretical or lean air-fuel ratio, the electronic control unit 14 judges that hydrogen gas should be supplied. If, on the other hand, it is detected that the engine is operating under high load, the electronic control unit 14 judges that hydrogen gas should not be supplied.

When the electronic control unit 14 judges that hydrogen gas should be supplied, prepared map data is used to determine the intake air amount and the fuel injection amounts of hydrocarbon fuel and hydrogen gas in accordance with the required torque calculated in step ST1 (step ST3). When the fuel injection amounts of hydrocarbon fuel and hydrogen gas are to be determined, the prepared map data is used to calculate the mixing ratio between the hydrocarbon fuel and hydrogen gas in accordance with the operating state detected in step ST2, and determine the fuel injection amounts in accordance with the calculated mixing ratio.

The electronic control unit 14 drives the hydrogen fuel pump 17*b* and microbubble generation device 16 in such a manner to obtain the calculated mixing ratio, and mixes microbubbles of a large amount of hydrogen gas into the hydrocarbon fuel in the second fuel supply path 15*d* (step ST4).

Subsequently, the electronic control unit 14 drives the throttle valve actuator 11 to adjust the valve opening angle of the throttle valve 10 for the purpose of obtaining the intake air amount determined in step ST3, and drives the fuel injection device 12 in such a manner as to obtain the determined fuel injection amounts (step ST5).

Air is then introduced into the intake path 3*b* in accordance with the determined intake air amount. Further, a fuel mixture of hydrocarbon fuel and hydrogen gas is injected in accordance with the determined fuel injection amounts. When the intake valve 7 opens, an air-fuel mixture of the introduced air and injected hydrocarbon fuel and hydrogen gas is drawn into the combustion chamber 2.

Subsequently, the electronic control unit 14 exercises ignition control over the ignition plug 13 to ignite the air-fuel mixture in accordance with the ignition timing that matches the required torque (step ST6), and causes the hydrogen-fueled internal combustion engine 1 to output the required torque.

On the other hand, when the electronic control unit 14 judges that hydrogen gas should not be supplied, the prepared map data is used to determine the intake air amount and the fuel injection amount of hydrocarbon fuel in accordance with the required torque calculated in step ST1 (step ST7).

In step ST5, the electronic control unit 14 drives the throttle valve actuator 11 to adjust the valve opening angle of the throttle valve 10 for the purpose of obtaining the determined intake air amount, and drives the fuel injection device 12 in such a manner as to obtain the determined fuel injection amount.

Air is then introduced into the intake path 3*b* in accordance with the determined intake air amount. Further, the hydrocarbon fuel is injected in accordance with the determined fuel injection amount. When the intake valve 7 opens, an air-fuel mixture of the introduced air and injected hydrocarbon fuel is drawn into the combustion chamber 2.

Subsequently, in step ST6, the electronic control unit 14 causes the ignition plug 13 to ignite the air-fuel mixture in accordance with the ignition timing that matches the required torque, and causes the hydrogen-fueled internal combustion engine 1 to output the required torque.

The above operation example deals with a case where the mixing ratio between the hydrocarbon fuel and hydrogen gas is determined in accordance with the operating state. In such a case, the maximum mixable amount of hydrogen gas or a smaller amount of hydrogen gas may be mixed with the liquid hydrocarbon fuel. The selective use of these two modes depends on the operating state. For precise combustion control purposes, the hydrogen gas addition amount for mixing should be controlled by selectively using either of the above two modes.

However, some hydrogen-fueled internal combustion engines 1 do not require such a selective use. In some cases, if the amount of hydrogen gas addition is reduced, the hydrogen-fueled internal combustion engine 1 might better be operated using only the hydrocarbon fuel from the viewpoint of emission performance and the like. Therefore, when the hydrogen-fueled internal combustion engine 1 requires the supply of hydrogen gas, the maximum mixable amount of hydrogen gas is always supplied and mixed with the liquid hydrocarbon fuel.

Although the first embodiment assumes that microbubbles having a diameter between several micrometers and several tens of micrometers are used, microbubbles having a diameter of not more than 1 micrometers may be used alternatively. The microbubbles having a diameter of not more than 1 micrometer are called nanobubbles. When nanobubbles of hydrogen gas are added to the liquid hydrocarbon fuel, a larger amount of hydrogen gas can be mixed with the hydrocarbon fuel than when microbubbles are used. This makes it possible to further improve the combustion efficiency, thereby further raising the lean limit and greatly reducing the fuel consumption rate and NOx exhaust amount.

The aforementioned hydrogen fuel tank 17a may store hydrogen gas through the use of a hydrogen storing alloy or hydrogen absorbing material. An alternative is to furnish a hydrogen generation device, which generates hydrogen gas by means of steam reforming of methanol, gasoline, or the like, liquid fuel reforming based on plasma discharge, or microchannel catalytic reforming, and operate the hydrogen generation device to supply hydrogen gas to the microbubble generation device 16. Another alternative is to generate hydrogen gas by separating hydrogen with an organic hydride. Further, if the microbubble generation device 16 can generate hydrogen gas from liquid hydrogen and form hydrogen gas microbubbles, the aforementioned hydrogen fuel tank 17a may be filled with liquefied hydrogen.

The first embodiment also assumes that the fuel injection device 12 injects fuel (hydrocarbon fuel and hydrogen gas) into the intake path 3b. Alternatively, however, the fuel injection device 12 may inject the fuel directly into the combustion chamber 2. In other words, the technology according to the present invention, which has been described above, can also be applied to a so-called intra-cylinder direct injection internal combustion engine that uses hydrocarbon fuel and hydrogen gas.

Second Embodiment

A second embodiment of the hydrogen-fueled internal combustion engine according to the present invention will now be described with reference to FIG. 3.

First of all, the configuration of the hydrogen-fueled internal combustion engine according to the second embodiment will be described. The reference numeral 20 in FIG. 3 denotes the hydrogen-fueled internal combustion engine according to the second embodiment. Although the figure shows only one cylinder, the present invention can also be applied to a multicylinder hydrogen-fueled internal combustion engine no matter whether it is, for instance, of inline type or V type.

The hydrogen-fueled internal combustion engine 20 according to the second embodiment mixes a larger amount of hydrogen gas into the liquid hydrocarbon fuel than the hydrogen-fueled internal combustion engine 1 according to the first embodiment. More specifically, the hydrogen-fueled internal combustion engine 20 according to the second embodiment is configured so that microbubbles of hydrogen gas are mixed into the liquid hydrocarbon fuel stored in the fuel tank 15a as well.

Figure 3:
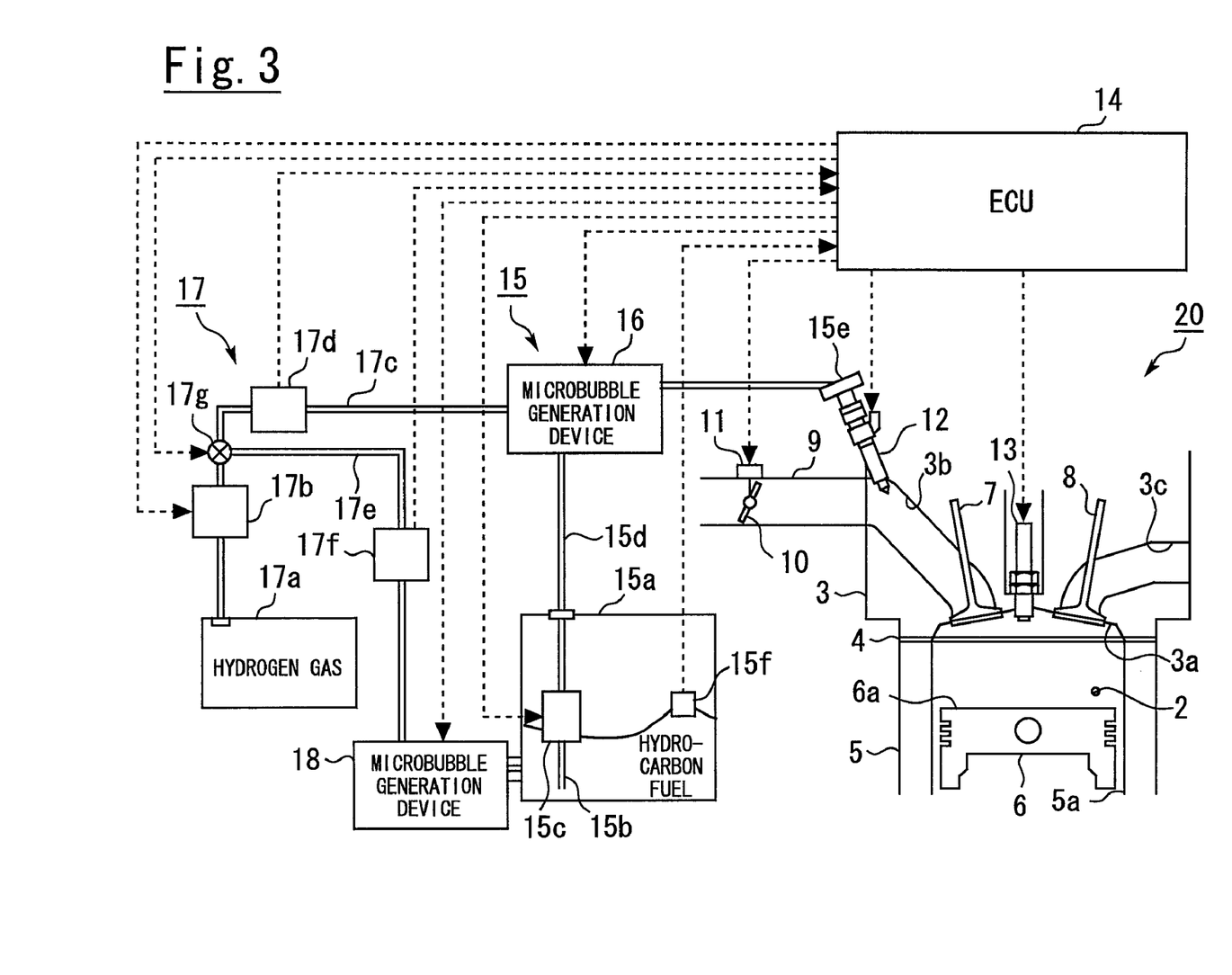
FIG. 3 illustrates the configuration of the hydrogen-fueled internal combustion engine according to a second embodiment of the present invention.

To achieve the above purpose, the second embodiment includes a second microbubble generation device 18, which generates hydrogen gas microbubbles to be added to the hydrocarbon fuel in the fuel tank 15a, in addition to the microbubble generation device (hereinafter referred to as the first microbubble generation device in the second embodiment) 16 that generates hydrogen gas microbubbles to be added to the hydrocarbon fuel in the second fuel supply path 15d, as shown in FIG. 3. The second microbubble generation device 18 is also driven under the control of the electronic control unit 14 as is the case with the first microbubble generation device 16.

The first and second microbubble generation devices 16, 18 may generate either microbubbles or nanobubbles.

In the second embodiment, the configuration of the hydrogen gas supply means 17 is changed in order to supply hydrogen gas to the second microbubble generation device 18 as well.

More specifically, a second hydrogen gas supply path 17e and a second hydrogen gas flowmeter 17f are newly furnished as shown in FIG. 3. The second hydrogen gas supply path 17e branches off from the hydrogen gas supply path (hereinafter referred to as the first hydrogen gas supply path in the second embodiment) 17c between the hydrogen fuel pump 17b and hydrogen gas flowmeter (hereinafter referred to as the first hydrogen gas flowmeter in the second embodiment) 17d, and directs the hydrogen gas from the first hydrogen gas supply path 17c to the second microbubble generation device 18. The second hydrogen gas flowmeter 17f detects the rate of a hydrogen gas flow in the second hydrogen gas supply path 17e. A detection signal that is generated by the second hydrogen gas flowmeter 17f is also fed to the electronic control unit 14.

Further, the hydrogen gas supply means 17 according to the second embodiment is provided with a flow path selector valve 17g, which is positioned at a branch point between the first hydrogen gas supply path 17c and second hydrogen gas supply path 17e. The electronic control unit 14 controls the flow path selector valve 17g so that either the first microbubble generation device 16 or second microbubble generation device 18 mixes hydrogen gas microbubbles into the hydrocarbon fuel.

In the second embodiment, which is configured as described above, the electronic control unit 14 first sets the flow path selector valve 17g to the second microbubble generation device position, drives the hydrogen fuel pump 17b in accordance with the amount of hydrocarbon fuel remaining in the fuel tank 15a while observing the value detected by the second hydrogen gas flowmeter 17f, and drives the second microbubble generation device 18 to which the hydrogen gas is supplied accordingly. The electronic control unit 14 observes the detection signal generated by remaining fuel detection means 15f, which is shown in FIG. 3, to judge the amount of remaining hydrocarbon fuel.

In the above instance, the hydrogen fuel pump 17b is driven so that the maximum amount of hydrogen gas microbubbles that can be mixed into the remaining amount of hydrocarbon fuel is supplied to the fuel tank 15a. The controlled variable (driving force) for the hydrogen fuel pump 17b can be determined from prepared map data that defines the relationship between the amount of hydrocarbon fuel remaining in the fuel tank 15a and the mixable hydrogen gas microbubble supply amount limit (that is, the controlled variable for the hydrogen fuel pump 17b). Therefore, the electronic control unit 14 drives the hydrogen fuel pump 17b in accordance with the result obtained from the map data while observing the value detected by the second hydrogen gas flowmeter 17f.

A large amount of hydrogen gas microbubbles is then mixed into the hydrocarbon fuel in the fuel tank 15a. Mixing is conducted until the maximum mixable amount is reached.

A fuel mixture of the hydrocarbon fuel and hydrogen gas is drawn, pressurized to a predetermined level, and supplied to the second fuel supply path 15d by the fuel pump 15c. The fuel mixture is pressurized when it passes through the fuel pump 15c so that an additional amount of hydrogen gas can be mixed into the fuel mixture.

Therefore, the electronic control unit 14 sets the flow path selector valve 17g to the first microbubble generation device position and then determines the maximum mixable amount of hydrogen gas that can be newly added to the fuel mixture in the second fuel supply path 15d. This maximum mixable amount can be determined, based on the same consideration as the first embodiment, from map data that defines the relationship between the rate of a fuel mixture flow in the second fuel supply path 15d (or the controlled variable for the fuel pump 15c) and the mixable hydrogen gas microbubble supply amount according to the flow rate (or the controlled variable for the fuel pump 15c) (that is, the controlled variable for the hydrogen fuel pump 17b).

The electronic control unit 14 exercises control not only to drive the hydrogen fuel pump 17b while observing the value detected by the first hydrogen gas flowmeter 17d so that the maximum mixable amount of hydrogen gas microbubbles is supplied to the second fuel supply path 15d, but also to drive the first microbubble generation device 16.

The hydrogen gas microbubbles generated by the first microbubble generation device 16 are then supplied to the second fuel supply path 15d. Further, a large amount of hydrogen gas can be additionally mixed into a fuel mixture flow in the second fuel supply path 15d.

As described above, the second embodiment can premix a larger amount of hydrogen gas into the hydrocarbon fuel than the first embodiment. Therefore, the second embodiment can improve the combustion efficiency to a higher level than the first embodiment, thereby further raising the lean limit. Consequently, the hydrogen-fueled internal combustion engine 20 according to the second embodiment can reduce the fuel consumption rate and NOx exhaust amount to lower levels than the first embodiment.

As is the case with the hydrogen-fueled internal combustion engine according to the first embodiment, the hydrogen-fueled internal combustion engine 20 according to the second embodiment also obviates the necessity for the conventional fuel injection device, fuel delivery pipe, and fuel supply path that are dedicated to hydrogen gas. The hydrogen-fueled internal combustion engine 20 according to the second embodiment allows two types of fuel to share the fuel injection device 12, second fuel supply path 15d, and fuel delivery pipe 15e. As a result, the second embodiment can also improve the mountability of various parts and reduce the production cost.

The second embodiment can also be applied to a so-called intra-cylinder direct injection internal combustion engine that directly injects fuel from the fuel injection device 12 to the combustion chamber 2.

The foregoing description of the second embodiment assumes that two microbubble generation devices (first and second microbubble generation devices 16, 18) supply hydrogen gas microbubbles to the second fuel supply path 15d and fuel tank 15a. However, the second embodiment may alternatively be configured so that one microbubble generation device can supply hydrogen gas microbubbles to the second fuel supply path 15d and fuel tank 15a. Another alternative is to supply hydrogen gas microbubbles to the fuel tank 15a only.

Third Embodiment

A third embodiment of the hydrogen-fueled internal combustion engine according to the present invention will now be described with reference to FIGS. 4 and 5.

Figure 4:
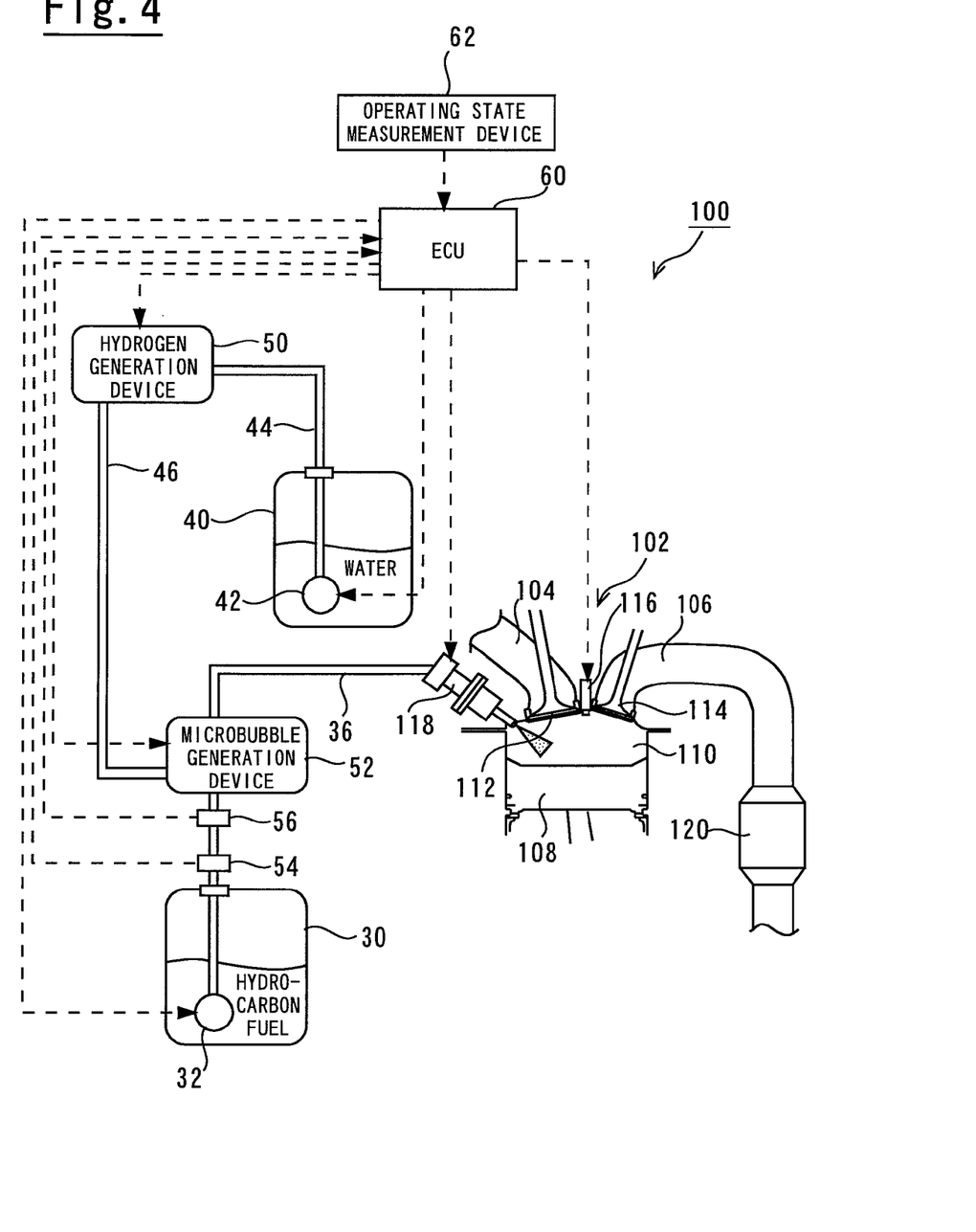
FIG. 4 illustrates the configuration of the hydrogen-fueled internal combustion engine according to a third embodiment of the present invention.

FIG. 4 illustrates the configuration of the hydrogen-fueled internal combustion engine according to the third embodiment will be described. The reference numeral 100 in FIG. 4 denotes the hydrogen-fueled internal combustion engine according to the third embodiment. The hydrogen-fueled internal combustion engine 100 according to the third embodiment includes an engine main body 102, which comprises a plurality of cylinders (although only one cylinder is shown in FIG. 4). The engine main body 102 has a piston 108 for each cylinder. The interior of each cylinder is provided with a combustion chamber 110, which repeatedly expands and contracts as the piston 108 moves up and down. The engine main body 102 is connected to an intake path 104 for supplying air to the combustion chamber 110 for each cylinder and an exhaust path 106 for discharging burned gas out of the combustion chamber 110. The exhaust path 106 is provided with a catalyst (e.g., NOx catalyst) for purifying the burned gas.

In the engine main body 102, the joint between the intake path 104 and combustion chamber 110 is provided with an intake valve 112, which controls the communication state between the intake path 104 and combustion chamber 110. The joint between the exhaust path 106 and combustion chamber 110 is provided with an exhaust valve 114, which controls the communication state between the exhaust path 106 and combustion chamber 110. The combustion chamber 110 is provided with a fuel injection device (intra-cylinder injector) 118, which directly injects fuel into the combustion chamber 110, and an ignition plug 116, which ignites a fuel mixture in the combustion chamber 110.

The fuel injection device 118 is connected to a fuel tank 30 via a fuel supply line 36. The fuel tank 30 stores gasoline, which is a liquid hydrocarbon fuel. The liquid fuel in the fuel tank 30 is drawn by a fuel pump (high-pressure pump) 32, which is installed in the fuel supply line 36, compressed to a predetermined pressure that is higher than the combustion gas pressure within the combustion chamber 110, and supplied to the intra-cylinder injector 118. The fuel pump 32 may be either a mechanical pump that is driven by the engine main body 102 or an electric pump that is driven by a motor. The fuel supply line 36 is provided with a fuel pressure sensor 54 and a fuel temperature sensor 56. The fuel pressure sensor 54 outputs a signal in accordance with the pressure of a liquid fuel flow in the fuel supply line 36. The fuel temperature sensor 56 outputs a signal in accordance with the temperature of a liquid fuel flow in the fuel supply line 36.

A microbubble generation device 52 is positioned downstream of the fuel pump 32 in the fuel supply line 36 to mix the liquid fuel with another fuel (hydrogen gas). The microbubble generation device 52 forms hydrogen gas microbubbles having a diameter of not larger than several tens of micrometers and mixes them into the liquid fuel in the fuel supply line 36. Since the microbubble generation device 52 forms the hydrogen gas microbubbles and mixes them into the liquid fuel, the hydrogen gas can be uniformed mixed into the liquid fuel. Further, the solution of hydrogen gas in the liquid fuel can be facilitated. The microbubble generation device 52 may use any microbubble generation method as far as it forms hydrogen gas microbubbles in the liquid fuel. Typical microbubble generation methods have already been described in conjunction with the first embodiment.

The hydrogen gas to be mixed into the liquid fuel by the microbubble generation device 52 is supplied from a hydrogen generation device 50 via a hydrogen gas supply line 46. The hydrogen generation device 50 can promptly generate hydrogen gas from a liquid hydrogen compound. For example, water, alcohol, gasoline, or light oil can be used as the liquid hydrogen compound. The third embodiment uses water as the liquid hydrogen compound. Some typical hydrogen gas generation methods that the hydrogen generation device 50 may use are described below.

The first hydrogen generation method is to electrolyze water by applying counterelectromotive force to a fuel cell.

The second hydrogen generation method is to decompose a liquid hydrogen compound with low-temperature plasma. More specifically, hydrogen gas can be generated by performing a direct-current pulse discharge in a liquid hydrogen compound.

The third hydrogen generation method is to reduce water with a highly active metal. For example, pure hydrogen gas can be generated when aluminum or aluminum alloy is rubbed in deionized water to accelerate the corrosion reaction of water with the metal and decompose water molecules. Pure hydrogen gas can also be generated by supplying water to a magnesium hydride or magnesium hydride alloy. Further, pure hydrogen gas can be generated due to metallic iron oxidation when water vapor is allowed to react with metallic iron that is obtained by reducing iron oxide.

When any of the above methods is used, hydrogen gas can be promptly generated from water or other liquid hydrogen compound. Particularly, the use of the third method makes it possible to generate pure hydrogen gas only. Further, hydrogen gas can be generated at a relatively low temperature or at an ordinary temperature when any of the above methods is used. Therefore, the use of the above methods is advantageous in that an increased amount of hydrogen gas can be dissolved in the liquid fuel when the microbubble generation device 52 mixes the hydrogen gas into the liquid fuel.

When hydrogen gas is generated by the hydrogen generation device 50, the hydrogen gas can be stored in a liquid state. Then, it is easier to handle the hydrogen gas than when a pressure tank or the like is used to store the hydrogen gas in a gaseous state. In addition, it is possible to achieve high mounting efficiency. In the third embodiment, the water used in the hydrogen generation device 50 for hydrogen gas generation purposes is supplied from a water tank 40 via a water supply line 44. A water pump 42 is installed in the water supply line 44 to draw water from the water tank 40 and supply the water to the hydrogen generation device 50.

The hydrogen-fueled internal combustion engine 100 according to the third embodiment includes an electronic control unit (ECU) 60. The output end of the electronic control unit 60 is connected to the aforementioned ignition plug 116, fuel injection device 118, fuel pump 32, water pump 42, microbubble generation device 52, hydrogen generation device 50, and various other devices. The input end of the electronic control unit 60 is connected to the aforementioned fuel pressure sensor 54 and fuel temperature sensor 56, an operating state measurement device 62 for acquiring the information (accelerator opening, vehicle velocity, engine speed, air-fuel ratio, water temperature, knock signal, etc.) about the operating state of the engine main body 102, and various other sensors. Upon receipt of outputs that are generated from the various sensors, the electronic control unit 60 controls various devices in accordance with a predetermined control program.

When hydrogen gas needs to be added to the liquid fuel, the hydrogen-fueled internal combustion engine 100 according to the third embodiment, which employs the system configuration described above, can promptly generate hydrogen gas from water by operating the hydrogen generation device 50, form hydrogen gas microbubbles, and mix the microbubbles into the liquid fuel. The routine shown in a flowchart in FIG. 5 is a hydrogen addition control routine that is executed by the electronic control unit 60 according to the third embodiment. Hydrogen addition control according to the third embodiment will now be described with reference to the flowchart in FIG. 5. The routine shown in FIG. 5 is periodically executed at a predetermined crank angle.

Figure 5:
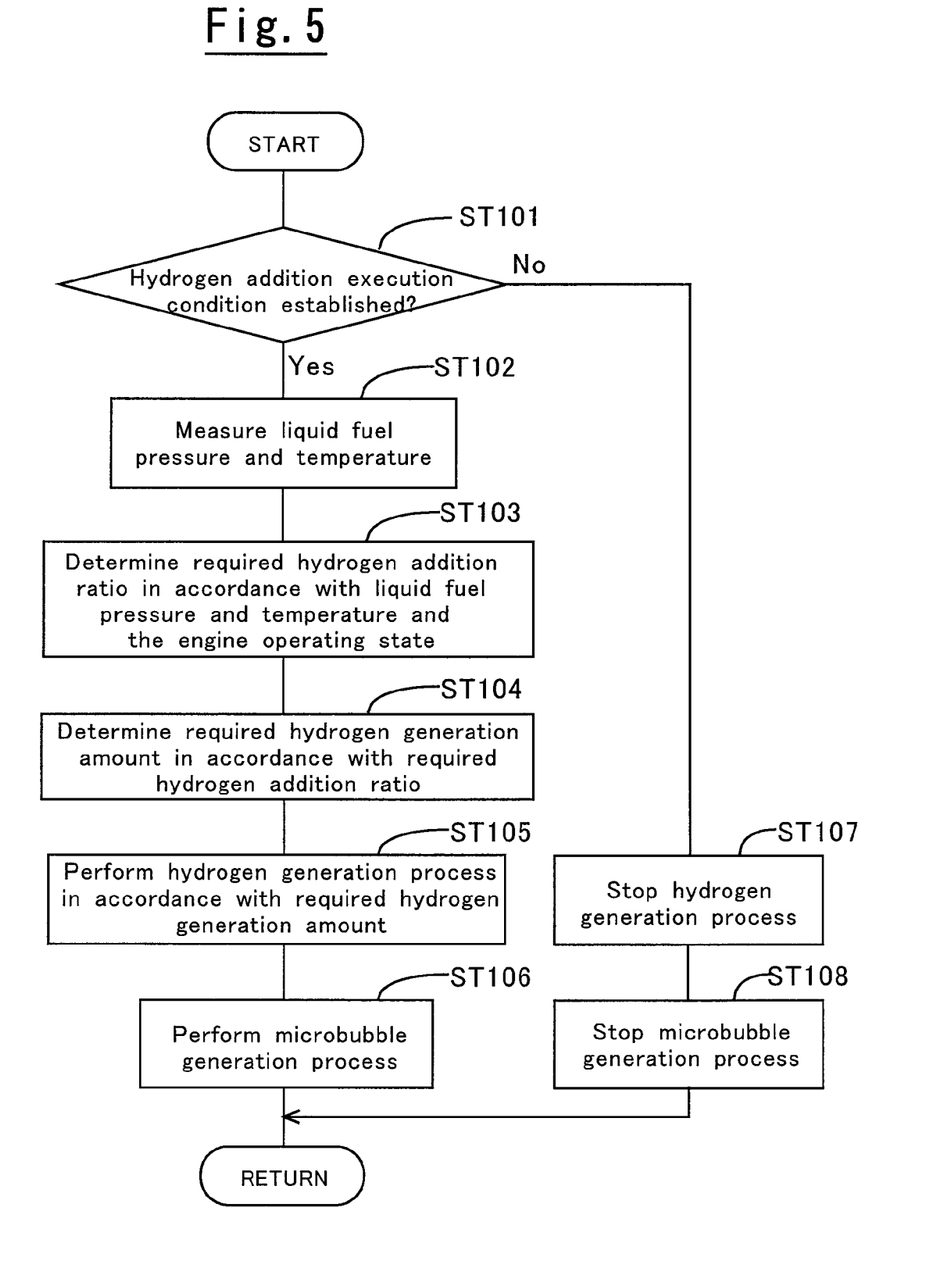
FIG. 5 is a flowchart illustrating a typical operation that is performed by the hydrogen-fueled internal combustion engine according to the third embodiment.

In step ST101, which is the first step of the routine shown in FIG. 5, the operating state of the engine main body 102, which is measured by the operating state measurement device 62, is noted to judge whether hydrogen addition execution conditions are established. The hydrogen addition execution conditions are established if, for instance, the engine main body 102 is operated in an operating range during which knocking may occur and operated in an operating range during which combustion variations may occur. If the hydrogen addition execution conditions are established, hydrogen gas is added to the liquid fuel by performing steps ST102 to ST106.

Step ST102 is performed to measure the liquid fuel pressure in accordance with a signal output from the fuel pressure sensor 54 and the liquid fuel temperature in accordance with a signal output from the fuel temperature sensor 56. The liquid fuel pressure and temperature are associated with the amount of hydrogen gas that can be dissolved in the liquid fuel, that is, the hydrogen saturation amount. The hydrogen saturation amount increases with an increase in the liquid fuel pressure and with a decrease in the liquid fuel temperature.

In the next step (step ST103), a stored map is noted to determine a required hydrogen addition ratio in accordance with the liquid fuel pressure and temperature and the operating state of the engine main body 102. The hydrogen addition ratio can be defined, for instance, as the ratio of hydrogen gas heat value to the total heat value of the fuel mixture of liquid fuel and hydrogen gas. The map defines an upper-limit value for the required hydrogen addition ratio in accordance with the liquid fuel pressure and temperature.

It is preferred that the upper-limit value for the required hydrogen addition ratio be not greater than the hydrogen addition ratio for the hydrogen saturation amount. When such an upper-limit value is used, the amount of hydrogen gas in the liquid fuel is adjusted so that it is not greater than the hydrogen saturation amount. Therefore, the added hydrogen gas does not separate from the liquid fuel. Even if the liquid fuel stays in the fuel supply line 36 for a long period of time, hydrogen gas separation does not occur to cause a problem. As a result, the system's robustness can be enhanced.

However, the above upper-limit value can be slightly greater than the hydrogen addition ratio for the hydrogen saturation amount. The reason is that when hydrogen gas microbubbles are formed, the hydrogen gas can uniformly exist in the liquid fuel as microbubbles without being separated from the liquid fuel even if the hydrogen addition amount slightly exceeds the hydrogen saturation amount.

The next step (step ST104) is performed to determine the required hydrogen generation amount (required hydrogen gas generation amount) in accordance with the required hydrogen addition ratio. More specifically, the required load on the engine main body 102 is determined in accordance with the accelerator opening, engine speed, and the like. The load carried by the hydrogen gas (hydrogen load) is then determined from the required load and required hydrogen addition ratio. Finally, the hydrogen gas amount appropriate for the hydrogen load is calculated as the required hydrogen generation amount in accordance, for instance, with the heat value per unit amount of hydrogen gas.

In the next step (step ST105), the water pump 42 operates so that an appropriate amount of water is supplied from the water tank 40 to the hydrogen generation device 50 in accordance with the required hydrogen generation amount. The hydrogen generation device 50 then operates to perform a hydrogen generation process for generating hydrogen gas in accordance with the required hydrogen generation amount. The generated hydrogen gas is supplied from the hydrogen generation device 50 to the microbubble generation device 52.

In the next step (step ST106), the microbubble generation device 52 forms hydrogen gas microbubbles. The resulting hydrogen gas microbubbles are then mixed into the liquid fuel. After being mixed with the hydrogen gas, the liquid fuel is supplied from the microbubble generation device 52 to the fuel injection device 118. The fuel injection device 118 injects the fuel mixture directly into the combustion chamber 110.

Since the injected fuel contains hydrogen gas, which has excellent combustibility, knocking during a high-load operation and combustion variations during a low-load operation are inhibited. If the judgment result obtained in step ST101 does not indicate that the hydrogen addition execution conditions are established, step ST107 is performed to stop the hydrogen generation process in the hydrogen generation device 50. Subsequently, step ST108 is performed to stop the microbubble generation process in the microbubble generation device 52.

The hydrogen addition control routine described above determines the hydrogen gas addition ratio while considering the liquid fuel pressure and temperature as well as the operating state of the engine main body 102. Therefore, an increased amount of hydrogen gas can be mixed into the liquid fuel at the current liquid fuel pressure and temperature without allowing the already added hydrogen gas to separate from the liquid fuel. Therefore, the hydrogen-fueled internal combustion engine 100 according to the third embodiment can make the most of the effect of hydrogen gas addition without sacrificing accurate fuel injection control that is exercised by the fuel injection device 118.

Further, since hydrogen gas is generated as needed from water as described above, it is not necessary to store the hydrogen gas in a gaseous state in which the hydrogen gas cannot easily be handled and the mounting efficiency is low. In addition, only the required amount of hydrogen gas is generated, and the generated hydrogen gas is entirely turned into microbubbles and mixed into the liquid fuel. Therefore, it is not necessary to furnish a buffer tank that adjusts the difference between the hydrogen gas generation amount and supply amount. Consequently, the engine according to the third embodiment is advantageous in that the system configuration can be simplified.

In the third embodiment, the "hydrogen addition amount determination means" according to the fourth aspect of the present invention is implemented when the electronic control unit 60 performs steps ST102, ST103, and ST104.

It is assumed that the third embodiment determines the upper-limit value for the required hydrogen addition ratio in accordance with the liquid fuel pressure and temperature. Alternatively, however, the upper-limit value for the required hydrogen addition ratio may be determined in accordance with either the liquid fuel pressure or liquid fuel temperature.

The configuration shown in FIG. 4 includes the fuel injection device (intra-cylinder injector) 118, which injects fuel directly into the combustion chamber 110. Alternatively, however, a fuel injection device (port injector) for injecting fuel into the intake port may be furnished.

Fourth Embodiment

A fourth embodiment of the hydrogen-fueled internal combustion engine according to the present invention will now be described with reference to FIGS. 6 and 7.

Figure 6:
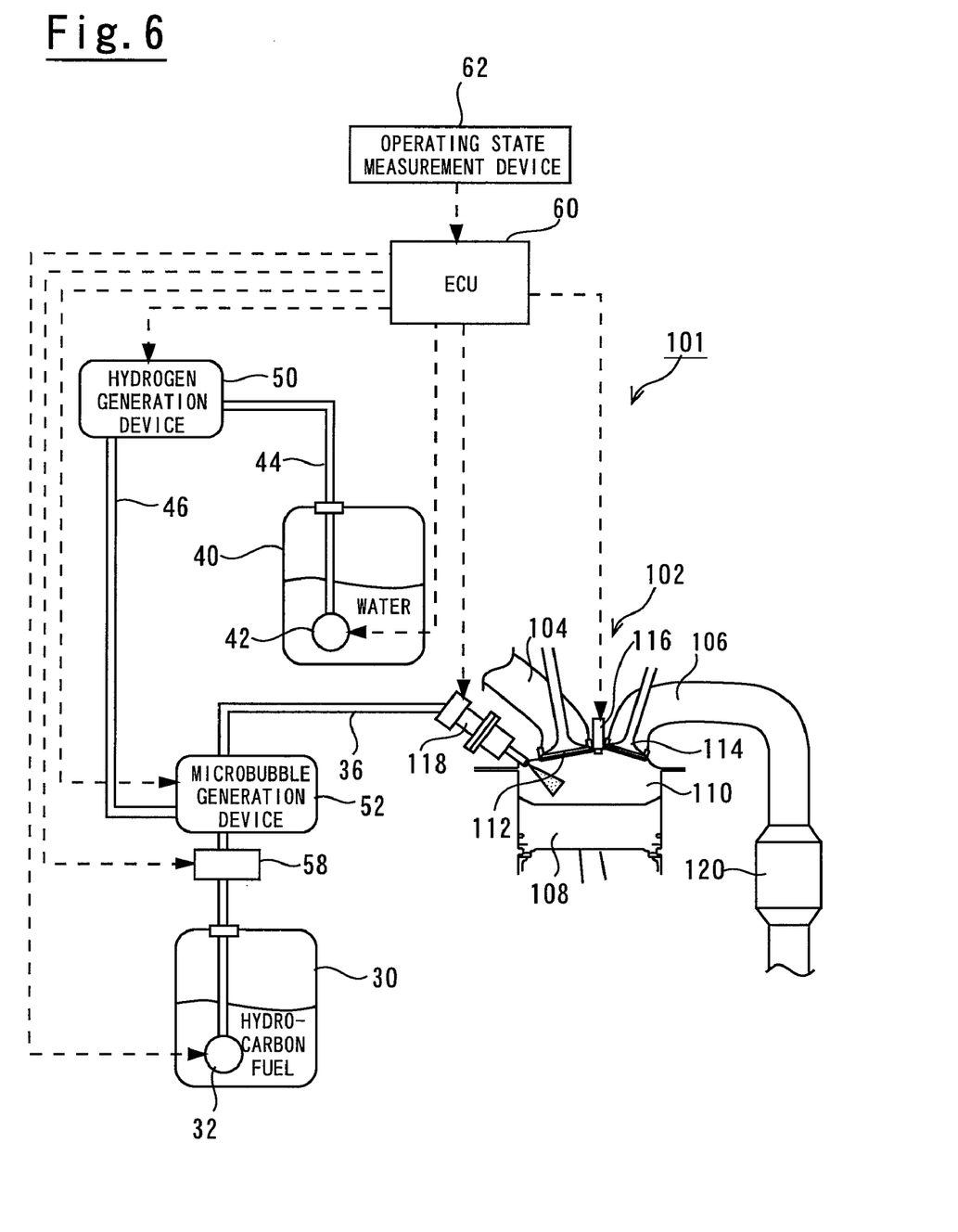
FIG. 6 illustrates the configuration of the hydrogen-fueled internal combustion engine according to a fourth embodiment of the present invention.

FIG. 6 shows the configuration of the hydrogen-fueled internal combustion engine according to the fourth embodiment. The reference numeral 101 in FIG. 6 denotes the hydrogen-fueled internal combustion engine according to the fourth embodiment. The hydrogen-fueled internal combustion engine 101 according to the fourth embodiment includes a pressure/temperature control device 58, which controls the pressure and temperature of a liquid fuel flow in the fuel supply line 36, in place of the fuel pressure sensor 54 and fuel temperature sensor 56 included in the hydrogen-fueled internal combustion engine 100 according to the third embodiment. In all other respects, the hydrogen-fueled internal combustion engine 101 according to the fourth embodiment has the same configuration as the hydrogen-fueled internal combustion engine 100 according to the third embodiment. In FIG. 6, elements identical with those described in conjunction with the third embodiment are designated by the same reference numerals as their counterparts.

The pressure/temperature control device 58 comprises a liquid fuel pressurization device and a liquid fuel cooling device. For example, a high-pressure pump may be used as the liquid fuel pressurization device. As the liquid fuel cooling device, a heat exchanger may be used.

The operation of the pressure/temperature control device 58 is controlled by the electronic control unit 60. The hydrogen gas saturation amount (hydrogen saturation amount) in the liquid fuel depends on the pressure and temperature of the liquid fuel. Therefore, when the liquid fuel pressure and temperature are controlled by the pressure/temperature control device 58, the hydrogen saturation amount can be indirectly controlled. When the hydrogen saturation amount can be controlled, it is possible to avoid the separation of added hydrogen gas from the liquid fuel and add an increased amount of hydrogen gas to the liquid fuel. The routine shown in a flowchart in FIG. 7 is a hydrogen addition control routine that is executed by the electronic control unit 60 according to the fourth embodiment. Hydrogen addition control according to the fourth embodiment will now be described with reference to the flowchart in FIG. 7. The routine shown in FIG. 7 is periodically executed at a predetermined crank angle.

Figure 7:
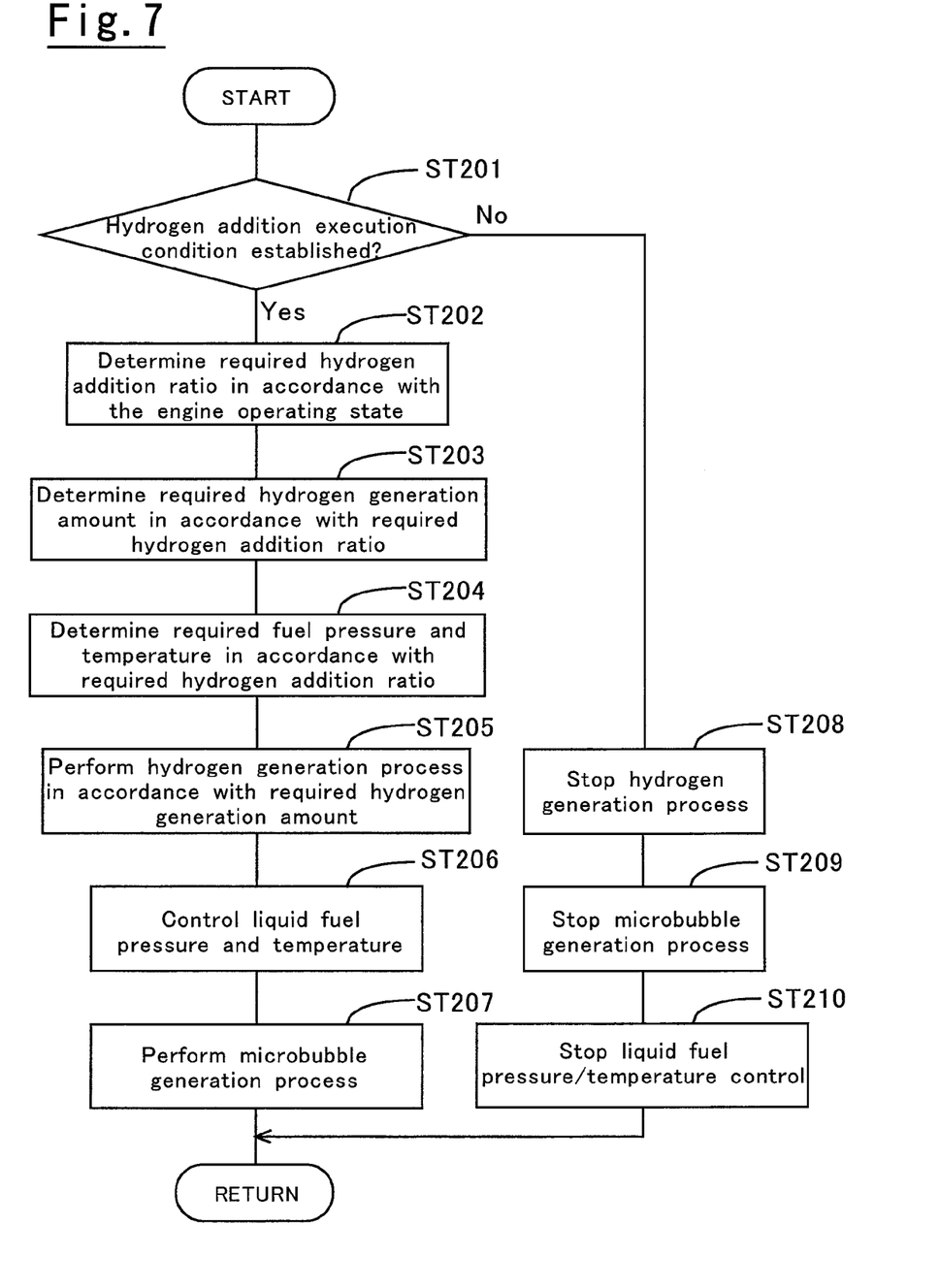
FIG. 7 is a flowchart illustrating a typical operation that is performed by the hydrogen-fueled internal combustion engine according to the fourth embodiment.

In step ST201, which is the first step of the routine shown in FIG. 7, the operating state of the engine main body 102, which is measured by the operating state measurement device 62, is noted to judge whether hydrogen addition execution conditions are established. If the hydrogen addition execution conditions are established, hydrogen gas is added to the liquid fuel by performing steps ST202 to ST207.

In the next step (step ST202), a stored map is noted to determine a required hydrogen addition ratio in accordance with the operating state of the engine main body 102. In the next step (step ST203), a required hydrogen generation amount is determined in accordance with the required hydrogen addition ratio.

In step ST204, the stored map is noted to determine required fuel pressure and temperature in accordance with the required hydrogen addition ratio. The map is organized so that the required fuel pressure increases with an increase in the required hydrogen addition ratio when the fuel temperature remains unchanged. The map is also organized so that the required fuel temperature decreases with an increase in the required hydrogen addition ratio when the fuel pressure remains unchanged. The reason is that the hydrogen saturation amount increases with an increase in the liquid fuel pressure and with a decrease in the liquid fuel temperature.

The required fuel pressure and temperature should be set so that the hydrogen saturation amount at the required fuel pressure and temperature is not smaller than the hydrogen saturation amount corresponding to the required hydrogen addition ratio. When the required fuel pressure and temperature are set in this manner, the amount of hydrogen gas in the liquid fuel does not exceed the hydrogen saturation amount. Thus, it is possible to avoid the separation of added hydrogen gas from the liquid fuel.

However, the required fuel pressure and temperature can be set so that the amount of hydrogen gas in the liquid fuel slightly exceeds the hydrogen saturation amount. The reason is that when hydrogen gas microbubbles are formed, the hydrogen gas can uniformly exist in the liquid fuel as microbubbles without being separated from the liquid fuel even if the hydrogen addition amount slightly exceeds the hydrogen saturation amount.

In the next step (step ST205), the water pump 42 and hydrogen generation device 50 operate to perform a hydrogen generation process in accordance with the required hydrogen generation amount. In step ST206, the pressure/temperature control device 58 operates so that the pressure and temperature of a liquid fuel flow in the fuel supply line 36 are adjusted for the required fuel pressure and temperature.

In the next step (step ST207), the hydrogen gas generated by the hydrogen generation device 50 is forwarded to the microbubble generation device 52 so that hydrogen gas microbubbles are generated. The generated hydrogen gas microbubbles are then mixed into the liquid fuel whose pressure and temperature are controlled by the pressure/temperature control device 58. The resulting mixture of the hydrogen gas and liquid fuel is supplied from the microbubble generation device 52 to the fuel injection device 118, and directly injected into the combustion chamber 110 from the fuel injection device 118.

Since the injected fuel contains hydrogen gas, which has excellent combustibility, knocking during a high-load operation and combustion variations during a low-load operation are inhibited. If the judgment result obtained in step ST201 does not indicate that the hydrogen addition execution conditions are established, step ST208 is performed to stop the hydrogen generation process in the hydrogen generation device 50. Subsequently, step ST209 is performed to stop the microbubble generation process in the microbubble generation device 52. Further, step ST210 is performed to stop the liquid fuel pressure/temperature control process in the pressure/temperature control device 58.

The hydrogen addition control routine described above controls the liquid fuel pressure and temperature in accordance with the hydrogen gas addition ratio. Therefore, it is possible to avoid the separation of added hydrogen gas from the liquid fuel after a required amount of hydrogen gas is mixed into the liquid fuel in accordance with the operating state of the engine main body 102. Consequently, the hydrogen-fueled internal combustion engine 101 according to the fourth embodiment can make the most of the effect of hydrogen gas addition without sacrificing accurate fuel injection control that is exercised by the fuel injection device 118.

In the fourth embodiment, the "hydrogen addition amount determination means" according to the fifth aspect of the present invention is implemented when the electronic control unit 60 performs steps ST202 and ST203. Further, the "control means" according to the fifth aspect of the present invention is implemented when the electronic control unit 60 performs steps ST204 and ST206.

The fourth embodiment controls both the liquid fuel pressure and temperature in accordance with the required hydrogen addition ratio. Alternatively, however, either the liquid fuel pressure or liquid fuel temperature may be controlled in accordance with the required hydrogen addition ratio.

The configuration shown in FIG. 6 includes the fuel injection device (intra-cylinder injector) 118, which injects fuel directly into the combustion chamber 110. Alternatively, however, a fuel injection device (port injector) for injecting fuel into the intake port may be furnished.

While the present invention has been described in terms of preferred embodiments, it should be understood that the present invention is not limited to those preferred embodiments, and that variations may be made without departure from the scope and spirit of the invention. For example, the hydrogen-fueled internal combustion engines shown in FIGS. 1, 3, 4, and 6 are configured as a gasoline engine, which uses gasoline as the fuel. However, the present invention can also be applied to a diesel engine, which uses light oil as the fuel.

INDUSTRIAL APPLICABILITY

As described above, the hydrogen-fueled internal combustion engine according to the present invention is useful as an internal combustion engine that burns hydrocarbon fuel and hydrogen gas as the fuel, and particularly suitable as a technology for supplying a large amount of hydrogen gas to the combustion chamber.

The invention claimed is:

1. A hydrogen-fueled internal combustion engine that uses liquid hydrocarbon fuel and hydrogen gas as fuel, comprising:
   a fuel injection device that injects the hydrocarbon fuel;
   fuel supply means for supplying the hydrocarbon fuel to the fuel injection device; and
   a microbubble generation device that generates microbubbles of hydrogen gas and mixes the generated microbubbles of hydrogen gas into the liquid hydrocarbon fuel in the fuel supply means,
   wherein the generated microbubbles of hydrogen are individual bodies of gas, suspended in the liquid hydrocarbon fuel, that have an outer diameter of less than 100 microns.

2. The hydrogen-fueled internal combustion engine according to claim 1, wherein the microbubble generation device is positioned so as to add microbubbles of hydrogen gas to hydrocarbon fuel in a fuel supply path that constitutes the fuel supply means.

3. The hydrogen-fueled internal combustion engine according to claim 1, wherein the microbubble generation device is positioned so as to directly add microbubbles of hydrogen gas to hydrocarbon fuel located in a fuel tank that constitutes the fuel supply means.

4. The hydrogen-fueled internal combustion engine according to claim 1, further comprising:
   hydrogen addition amount determination means for determining an amount of hydrogen gas to be mixed into hydrocarbon fuel by the microbubble generation device in accordance with an operating state of the internal combustion engine and at least one of a pressure or a temperature of the hydrocarbon fuel, wherein the operating state of the internal combustion engine includes a determination of engine load and an air-fuel ratio.

5. The hydrogen-fueled internal combustion engine according to claim 4, further comprising:

control means for controlling at least one of a pressure or a temperature of the hydrocarbon fuel to be supplied to the fuel injection device by the fuel supply means in accordance with a hydrogen gas addition amount that is determined by the hydrogen addition amount determination means.

6. The hydrogen-fueled internal combustion engine according to claim 1, further comprising:

hydrogen generation means for generating hydrogen gas from a liquid hydrogen compound, wherein the hydrogen generation means generates only the amount of hydrogen gas to be mixed into hydrocarbon fuel by the microbubble generation device.

7. A hydrogen-fueled internal combustion engine that uses liquid hydrocarbon fuel and hydrogen gas as fuel, comprising:

a fuel injection device that injects the hydrocarbon fuel;

fuel supply device that supplies the hydrocarbon fuel to the fuel injection device; and a microbubble generation device that generates microbubbles of hydrogen gas and mixes the generated microbubbles of hydrogen gas into liquid hydrocarbon fuel in the fuel supply device, wherein the generated microbubbles of hydrogen are individual bodies of gas, suspended in the liquid hydrocarbon fuel, that have an outer diameter of less than 100 microns.

8. The hydrogen-fueled internal combustion engine according to claim 7, further comprising:

hydrogen addition amount determination device that determines an amount of hydrogen gas to be mixed into hydrocarbon fuel by the microbubble generation device in accordance with an operating state of the internal combustion engine and a pressure of the hydrocarbon fuel, wherein the operating state of the internal combustion engine includes a determination of engine load and an air-fuel ratio.

9. The hydrogen-fueled internal combustion engine according to claim 8, further comprising:

a controller that controls a pressure of the hydrocarbon fuel to be supplied to the fuel injection device by the fuel supply device in accordance with a hydrogen gas addition amount that is determined by the hydrogen addition amount determination device.

10. The hydrogen-fueled internal combustion engine according to claim 1, wherein a pressure difference between an internal pressure of a microbubble and an external pressure of the microbubble is equal to four times a surface tension of the microbubble divided by the diameter of the microbubble.

11. The hydrogen-fueled internal combustion engine according to claim 1, wherein the microbubble generation device is a swirling device that creates swirling flows of the hydrogen gas and the hydrocarbon fuel and includes an empty space at a rotation center, such that the hydrogen gas is divided into the microbubbles by shearing forces generated in the empty space.

12. The hydrogen-fueled internal combustion engine according to claim 1, wherein the microbubble generation device is an ultrasonic device that ultrasonically vibrates the hydrogen gas to create the microbubbles.

13. The hydrogen-fueled internal combustion engine according to claim 1, wherein the fuel including the microbubbles of hydrogen is injected into the internal combustion engine.

14. A hydrogen-fueled internal combustion engine that uses liquid hydrocarbon fuel and hydrogen gas as fuel, comprising:

a fuel injection device that injects the hydrocarbon fuel;

fuel supply device that supplies the hydrocarbon fuel to the fuel injection device; and a first microbubble generation device that generates a first plurality of microbubbles of hydrogen gas and mixes the generated first plurality of microbubbles of hydrogen gas into the liquid hydrocarbon fuel that flows in a fuel supply path;

a second microbubble generation device that generates a second plurality of microbubbles of hydrogen gas and mixes the generated second plurality of microbubbles of hydrogen gas into the liquid hydrocarbon fuel that is located in a fuel tank, wherein the first and second pluralities of microbubbles of hydrogen are individual bodies of gas, suspended in the liquid hydrocarbon fuel, that have an outer diameter of less that 100 microns.

15. The hydrogen-fueled internal combustion engine according to claim 4, wherein the operating state includes a low or medium engine load and a stoichiometric or lean air-fuel ratio, then the hydrogen is not supplied to the internal combustion engine, and wherein the operating state includes a high engine load, then the hydrogen is supplied to the internal combustion engine.

16. The hydrogen-fueled internal combustion engine according to claim 8, wherein the operating state includes a low or medium engine load and a stoichiometric or lean air-fuel ratio, then the hydrogen is not supplied to the internal combustion engine, and wherein the operating state includes a high engine load, then the hydrogen is supplied to the internal combustion engine.

* * * * *